United States Patent Office 3,462,519
Patented Aug. 19, 1969

3,462,519
TERT. BUTYLESTER OF O,O-DIETHYLDITHIO-
PHOSPHORYL-ALPHA-PHENYLACETIC ACID
Raffaello Fusco, Giuseppe Losco, and Mario Perini, Milan,
Italy, assignors to Montecatini Edison S.p.A., Milan,
Italy
No Drawing. Continuation of application Ser. No.
458,783, May 25, 1965. This application Dec. 29,
1967, Ser. No. 694,755
Claims priority, application Italy, May 26, 1964,
11,663/64
Int. Cl. C07f 9/16; A01n 9/36
U.S. Cl. 260—941          1 Claim

ABSTRACT OF THE DISCLOSURE

Described is tert. butylester of O,O-diethyldithiophosphoryl-alpha-phenylacetic acid with the formula:

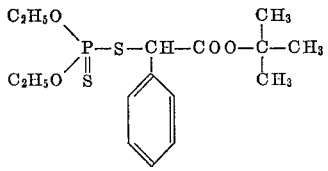

which is used in fighting parasites.

---

This is a continuation application of application Ser. No. 458,783, filed May 25, 1965.

The object of our invention is tert. butylester of O,O-diethyldithiophosphoryl-alpha-phenylacetic acid, a new antiparasitic substance.

It is known that some alkyl esters of O,O-dialkyldithiophosphoryl-alpha-phenylacetic acid show antiparasitic activity. The tert. butylester of O,O-diethyldithiophosphoryl-alpha-phenylacetic acid, however, has never been described.

Applicants have surprisingly found that this new substance has not only a conspicuous antiparasitic activity, but also, to a high degree, the characteristic, extremely useful in practical employment, of maintaining practically unaltered its efficacy for a long period after its application. Moreover, this substance shows a low toxicity towards warm-blooded animals (on a rat by os mg./kg. in dimethylacetamide)=100; on a rat by injection into the vein mg./kg. in dimethylacetamide=35).

Therefore, the objects of the present invention are the tert. butylester of O,O-diethyldithiophosphoryl - alpha-phenylacetic acid as new industrial product, its use in fighting parasites and the antiparasitic compositions containing it. This ester has the appearance of a white crystalline substance having a melting point of 45.5–46° C. It is practically insoluble in water, while soluble in the common organic solvents such as ethyl alcohol, acetone, ethyl ether, benzol, dioxane, dimethylacetamide, xylol.

The substance is prepared by reacting an alkaline salt of O,O-diethyldithiophosphoric acid with an alpha-halo-alpha-phenylacetic ester of tert. butylalcohol, such as for example the alpha-bromo-alpha-phenylacetic ester of tertiary butylalcohol.

Alpha-bromo - alpha - phenylacetic ester of tertiary butylalcohol was prepared by operating as here below indicated: adding 474 g. of pyridine to a cooled solution of 444 g. of tert. butylalcohol in 960 cc. of chloroform and subsequently, while keeping the temperature between 0° C. and +5° C. and under strong stirring, adding 1668 g. of the bromide of alpha-bromo-phenylacetic acid in 40 minutes. After the addition, the temperature was allowed to rise to room temperature and the whole was washed with water, then with a diluted NaHCO₃ solution and finally once more with water. After drying on calcium chloride and evaporation of the solvent under reduced pressure, about 1370 g. of a transparent slightly brown oil consisting of tert. butyl alpha-bromo-phenylacetate were obtained.

Tert. butylester of O,O - diethyldithiophosphoryl-alpha-phenylacetic acid can be prepared as follows:

2330 cc. of a solution containing 1260 g. of sodium O,O-diethyldithiophosphate dissolved in water are added to a solution of 1370 g. of tert. butyl alpha-bromophenyl-acetate in 1500 cc. of acetone and the whole is stirred at room temperature for 15 hours. After decantation two layers form, the lower layer is removed, the upper layer is poured into 8 liter of ice water under strong stirring. The useful product is separated in the form of granules. The covering liquid is removed by decantation. The product is washed subsequently with a dilute NaHCO₃ solution and centrifuged in a hydroextractor while thoroughly washing with water. 1400 g. of a product having a melting point of 42–45° C. (after drying in the air) and consisting of the tert. butylester of O,O-diethyldithiophosphoryl-alpha-phenylacetic acid are obtained. A sample crystallized from methanol has a melting point of 45.5–46° C.

The range of action against parasites of the substance which is the object of the present invention is remarkably wide, because it acts against acari, Emiptera, Coleoptera, Diptera, Orthoptera, and Lepidoptera.

Dilute compositions having a 0.01‰ content of the tert. butylester of O,O - diethyldithiophosphoryl-alpha-phenylacetic acid, called hereinafter by its code name M 1579, kill, by direct spraying, 100% of the adults of the *Tetranychus urticae* Koch. Compositions having a 1‰ content kill, by direct spraying, 100% of the adults of the *Aphis pomi* de Geer, of *Myzus cerasi* P., of *Yezabura plantaginea* Pass., of the 4 days old larvae of the *Leptinetarsa decemlineata* Say. Compositions containing 0.1‰ of M 1579 kill 100% of the 7 days old neanides of the *Schistocerca gregaria* Fosk., put onto maize leaves treated by spraying some hours before. 0.8γ/fly kill 95% of the adults of the *Musca domestica* L. by local application, 0.0045 g./m.² of treated surface kill 95% of the adults of the *Musca domestica* L. by tarsal contact.

In order to evaluate the activity of M 1579 against the larvae of phyllophagous Lepidoptera, *Pieris brassicae* was chosen as the test insect.

Not only the initial larvicidic action was determined, but also the persistence of the action under natural conditions. It has been observed that M 1579 distinguishes itself with respect to the products currently used also because of the combination of a high action intensity with a remarkable persistence thereof in time. This characteristic causes the product to be considered particularly useful for practical employment against larvae of the Macrolepidoptera, i.e. in a field which is, as is known, very important. In fact, it is sufficient to remember the importance, extent and diffusion of certain herbaceous cultivations (cotton, tobacco, beet roots, maize, horticulture, floriculture), the great damages done to them by numerous kinds of Lepidoptera and the reduction of the efficacious phytopharmaceutical products and the consequent coming up and propagation of generations of phytophagi resistant to the various known insecticides.

The initial activity against young larvae of the *Pieris brassicae* was determined by operating as follows: cut-off cabbage leaves are sprayed, under uniform and repeatable conditions, with formulations diluted with water until active substance contents of 1‰ and 0.1‰ are reached. As comparison, products of current-use commercial formulations have been used, while as M 1579 a liquid formulation consisting of 20 parts by weight of active substance, 77.5 parts of xylol and 2.5 parts of a mixture of an anionic and a non-ionic surfactant is used.

About three hours after spraying, 25 larvae of the *Pieris brassicae*, come out of the eggs 1–2 days before, are put onto each leaf, kept immersed by its stem in a flask of water.

The leaves and the larvae, enclosed in a glass cylinder covered by a metallic disc provided with small holes, are kept at 24–26° C. in a room illuminated with fluorescent tubes of the type Philips TL/40 Watt/50 having an illumination intensity of 1250 lux, for 16 hours per day.

At intervals of 24 and 72 hours after transferring the larvae, the determination of the results is carried out by registering the number of dead larvae and then calculating the percentage.

TABLE I.—INITIAL ACTIVITY AGAINST LARVAE OF THE *PIERIS BRASSICAE*

| Active substances | Percentage of dead larvae | | | |
|---|---|---|---|---|
| | 0.1% | | 1% | |
| | 24 h. | 72 h. | 24 h. | 72 h. |
| M 1579 | 100 | 100 | 100 | 100 |
| Methylparathion | 100 | 100 | 100 | 100 |
| Parathion | 100 | 100 | 100 | 100 |
| Lindane | 84 | 100 | 100 | 100 |
| Sevin | 58 | 78 | 98 | 100 |

In order to determine the persistence of the activity of the products against young larvae of the *Pieris brassicae* we operated as follows:

(a) Spraying of cabbage plants in pots with formulations diluted with water to a 0.1‰ content of active substance;

(b) Preservation of the treated plants in the open and therefore under natural climatic and meterologic conditions;

(c) Taking of leaves at different time intervals, after artificially treating and infesting the same in laboratory with 25 1–2 days old larvae of the *Pieris brassicae*;

(d) Determination of the results 24 and 72 hours after putting the larvae onto the leaves, by registering the number of dead larvae and then calculating the percentage.

Two distinct tests having the following variables were carried out:

1st test (Table II).—Products compared: M 1579, Sevin, methylparathion, parathion.

Plant used: white cabbage—date of the treatment: Oct. 11, 1961.

Conditions of the surroundings: Temperature: during the first 6 days maxima of 25° C. and minima during the night of 5° C. and during the last 11 days maxima of 20° C. and minima during the night of 10° C. were registered.

Rain: 6, 7, 17 and 19 days after the treatment precipitations took place of 42, 38, 18, 13, 13.5 mm., respectively.

TABLE II.—PERSISTENCE OF THE ACTIVITY AGAINST LARVAE OF THE *PIERIS BRASSICAE*

| Name of the active substances | Percentage of dead larvae | | | | | |
|---|---|---|---|---|---|---|
| | After 1 day | | After 12 days | | After 24 days | |
| | 24 h. | 72 h. | 24 h. | 72 h. | 24 h. | 72 h. |
| M 1579 | 100 | 100 | 81 | 100 | 68 | 85 |
| Parathion | 100 | 100 | 30 | 100 | 0 | 0 |
| Methylparathion | 100 | 100 | 4 | 13 | 0 | 0 |
| Sevin | 77 | 81 | 0 | 0 | 0 | 0 |

2nd test (Table III).—Products compared: M 1579, Sevin, parathion lindane, DDT, dieldrin, Gusathion.

Plant used: black cabbage—date of the treatment: Nov. 7, 1961.

Conditions of the surroundings: Temperature: during the first 2 days maxima of 14° C. and minima in the night of 1° C., during the following 11 days maxima of 18° C. and minima during the night of 7° C., during the following 5 days maxima of 11° C. and minima during the night of 2° C., and during the last days maxima of 15° C. and minima of 8° C. were registered.

Rain: almost daily precipitations in small quantities (1–10 mm.) and a more considerable precipitation (45 mm.) five days after the treatment.

TABLE III.—PERSISTENCE OF THE ACTIVITY AGAINST LARVAE OF THE *PIERIS BRASSICAE*

| Name of the active substances | Percentage of dead larvae | | | |
|---|---|---|---|---|
| | After 1 day | | After 30 days | |
| | 24 h. | 72 h. | 24 h. | 72 h. |
| M 1579 | 100 | 100 | 100 | 100 |
| Parathion | 100 | 100 | 0 | 7 |
| DDT | 100 | 100 | 0 | 27 |
| Gusathion | 100 | 100 | 0 | 0 |
| Lindane | 100 | 100 | 6 | 11 |
| Dieldrin | 12 | 90 | 0 | 37 |
| Sevin | 23 | 67 | 0 | 0 |

From the data reported in Table I it can be deduced that among the products used methylparathion and parathion have the highest immediate activity, followed by lindane, and, with considerably less effect, by Sevin. The activity of M 1579 is of the order of methylparathion and parathion.

M 1579 was also compared to compounds comprised in the general formula taught in U.S. Patent 2,947,662, which are analogs to M 1579. In Tables IV and V, the initial activity and persistence data for every tested compound are given. The operative conditions are the same as those described in the preceding tests.

TABLE IV.—INITIAL ACTIVITY AGAINST YOUNG LARVAE OF THE *PIERIS BRASSICAE*

| Active substances | Percentage of dead larvae | | | |
|---|---|---|---|---|
| | Conc. a.s. 0.01‰ | | Conc. a.s. 0.1‰ | |
| | 24 h. | 72 h. | 24 h. | 72 h. |
| $\begin{array}{c}C_2H_5O\\ \phantom{aa}\diagdown\\ \phantom{aaaa}P=S\\ \phantom{aa}\diagup\phantom{aa}\diagdown\\ C_2H_5O\phantom{aaaa}S-CH-C(=O)-O-C(CH_3)_3\\ \phantom{aaaaaaaaaaaaa}|\\ \phantom{aaaaaaaaaaaaa}C_6H_5\end{array}$ M1579 | 67 | 100 | 100 | 100 |
| $\begin{array}{c}CH_3O\\ \phantom{aa}\diagdown\\ \phantom{aaaa}P=S\\ \phantom{aa}\diagup\phantom{aa}\diagdown\\ CH_3O\phantom{aaaa}S-CH-C(=O)-O-C_2H_5\\ \phantom{aaaaaaaaaaaaa}|\\ \phantom{aaaaaaaaaaaaa}C_6H_5\end{array}$ (1) | 0 | 50 | 63 | 100 |

TABLE IV—Continued

| Active substances | Percentage of dead larvae | | | |
| --- | --- | --- | --- | --- |
| | Conc. a.s. 0.01%₀₀ | | Conc. a.s. 0.1%₀₀ | |
| | 24 h. | 72 h. | 24 h. | 72 h. |
| (C$_2$H$_5$O)$_2$P(=S)–S–CH(C$_6$H$_5$)–C(=O)–O–C$_2$H$_5$  (2) | 17 | 32 | 45 | 94 |
| (C$_2$H$_5$O)$_2$P(=S)–S–CH(4-NO$_2$-C$_6$H$_4$)–C(=O)–O–CH(CH$_3$)$_2$  (3) | 0 | 0 | 0 | 0 |
| (C$_2$H$_5$O)$_2$P(=S)–S–CH(4-Cl-C$_6$H$_4$)–C(=O)–O–C$_2$H$_5$  (4) | 0 | 0 | 78 | 100 |
| (C$_2$H$_5$O)$_2$P(=S)–S–CH(4-NO$_2$-C$_6$H$_4$)–C(=O)–O–C$_2$H$_5$  (5) | 0 | 0 | 0 | 0 |

TABLE V.—PERSISTENCE OF ACTIVITY AGAINST YOUNG LARVAE OF *PIERIS BRASSICAE* OF THE PRODUCTS AT THE EXPERIMENTAL CONC. OF 0.1%₀₀ A.S.

| Active substances | Percentage of dead larvae after— | | | |
| --- | --- | --- | --- | --- |
| | 12 days | | 24 days | |
| | 24 h. | 72 h. | 24 h. | 72 h. |
| (C$_2$H$_5$O)$_2$P(=S)–S–CH(C$_6$H$_5$)–C(=O)–O–C(CH$_3$)$_3$   M1579 | 81 | 100 | 68 | 85 |
| (CH$_3$O)$_2$P(=S)–S–CH(C$_6$H$_5$)–C(=O)–O–C$_2$H$_5$   (1) | 0 | 0 | 0 | 0 |

TABLE V—Continued

| Active substances | Percentage of dead larvae after— | | | |
| --- | --- | --- | --- | --- |
| | 12 days | | 24 days | |
| | 24 h. | 72 h. | 24 h. | 72 h. |
| 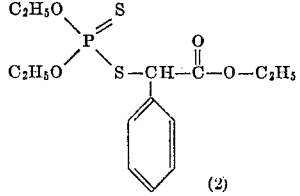 (2) | 0 | 0 | 0 | 0 |
| 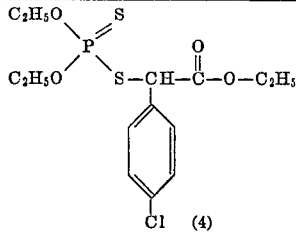 (4) | 0 | 0 | 4 | 4 |

The substances (3) and (5) are not reported in Table V because they have no activity against *Pieris brassicae* at the experimental concentration (see Table IV).

From the data reported in Tables III and V, it can be deduced that M 1579 makes the cabbage leaves toxic for the young larvae of the *Pieris brassicae* for a longer period than parathion, methylparathion as well as Sevin, DDT, Gusathion, lindane, dieldrin and compounds disclosed in U.S. Patent 2,947,662.

The compound of the present invention can be formulated for employment without difficulty in the way considered most ideal for the specific application which it is destined to serve.

Formulations in powder form are prepared by intimately mixing the active substance with inert substances of the type of diatomaceous earth, kaolin, attapulgite, cetite, bentonite, clay, and with wetting and suspension agents selected from the classes of the anionic and non-ionic surfactants, and grinding it in a micro-pulverizing mill until the desired fineness is reached. In order to increase the resistance to washing out, adhesives like calcium caseinate, albumin, polyvinyl alcohol etc. can be added.

A formulation of this type, for example, can be prepared by intimately mixing 20 parts by weight of M 1579, 72 parts by weight of diatomaceous earth, 2 parts by weight of sodium dinaphthylmethanedisulphonate, 4 parts of oleyl-methyltaurinate and 2 parts by weight of oxyethylated castor oil, and grinding in a micro-pulverizer until a fineness of 325 mesh is reached. For use, the formulation is dispersed under stirring in a little water until a homogeneous suspension is obtained and then the amount of water necessary to reach the concentration desired is added. For farm use, a suspension obtained with 0.1–0.5 kg. of the above-indicated formulation in a hectoliter of water can conveniently be used.

Powders for dry pulverizations are prepared by intimately mixing the active substance with inert substances such as talc, pyrophyllite, steatite, and grinding until the desired thinness is reached. A formulation of this type can, for example, be obtained by mixing 3 parts of M 1579 with 97 parts of talc and grinding in a micro-pulverizer until a thinness of 230 mesh is reached.

Liquid formulations are prepared by dissolving the active substance and an emulsifier in a solvent. A formulation of this type is obtained by dissolving 20 parts of M 1579, 2 parts of calcium dodecylbenzenesulphonate and 2 parts of a fatty oxyethylated alcohol in 76 parts of xylol. When pouring 0.1–0.5 kg. of this formulation into 100 liter of water, under stirring, an emulsion is obtained, which can be employed in the spraying of vegetables.

Antiparasitic substances of different nature and activity can be part of the compositions of the above-indicated type, together with the tert.-butylester of O,O-diethyldithiophosphoryl-alpha-phenylacetic acid.

The chemical names of the above-mentioned insecticides are:

Sevin, 1-naphthyl-N-methylcarbamate;
Parathion, O,O-diethyl-o-p-nitrophenylthiophosphate
Lindane, 1,2,3,4,5,6-hexachlorocyclohexane
DDT, dichlorodiphenyltrichloroethane
Dieldrin, 1,2,3,4,10,10-hexachloro-6,7 - epoxy - 1,4,4a,5, 6,7,8-orthohydro-1,4,5,8-dimethano-naphthalene.

We claim:

1. Tert. butylester of O,O - diethyldithiophosphoryl-alpha-phenylacetic acid with the formula:

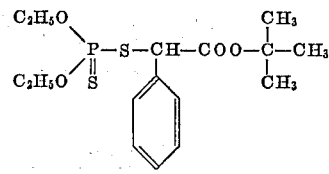

References Cited

UNITED STATES PATENTS 2,947,662 8/1960 Fusco et al.
3,047,459 7/1962 Perini et al.

JOSEPH P. BRUST, Primary Examiner

ANTON H. SUTTO, Assistant Examiner

U.S. Cl. X.R.

260—979; 424—212